May 29, 1951 R. L. BURTNER 2,554,936

RADIO-FREQUENCY DEVICE

Filed May 18, 1944 2 Sheets-Sheet 1

INVENTOR.
RICHARD L. BURTNER
BY C. D. Tuska
ATTORNEY

May 29, 1951 R. L. BURTNER 2,554,936

RADIO-FREQUENCY DEVICE

Filed May 18, 1944 2 Sheets-Sheet 2

INVENTOR.
RICHARD L. BURTNER
BY

ATTORNEY

Patented May 29, 1951 2,554,936

UNITED STATES PATENT OFFICE 2,554,936

RADIO-FREQUENCY DEVICE

Richard L. Burtner, Princeton, N. J., assignor to Radio Corporation of America, a corporation of Delaware Application May 18, 1944, Serial No. 536,161

9 Claims. (Cl. 250—33)

This invention relates to radio frequency scanning devices including means for changing the plane of polarization.

Numerous devices have been proposed for scanning a scene to be reproduced by reflected radio frequency energy. In such devices the radio frequency energy is preferably transmitted in the form of a scanning beam which is received after reflection and is translated into useful signals which are applied to an indicator such as a cathode ray tube. An example of such scanning systems is disclosed in a copending application Serial No. 232,647, filed by Irving Wolff on September 30, 1938 entitled Radio Vision. Another suitable scanning device is disclosed in a copending application Serial No. 533,311, filed by Harley A. Iams on April 29, 1944 entitled Radio Wave Devices, now Patent No. 2,504,333 granted April 18, 1950. In the copending application of Harley Iams, means are disclosed for scanning a scene along one coordinate by means of a beam of radio frequency energy which is polarized in a predetermined plane.

According to the present invention, two of the focusing or scanning means disclosed in the Iams application are employed for scanning a scene along two coordinates. Other focusing and scanning devices which produce similar shaped beams and deflection might, of course, be used. Since one of the scanning devices establishes a radio frequency field in which the electric vector is disposed in a predetermined plane and since the other scanning device has its maximum response when the electric vector is disposed in a plane differing from the plane of the first electric vector, it is necessary to provide means for rotating the plane of polarization. The present invention relates to the scanning means and to the means for rotating the plane of polarization.

Among the objects of the invention are: to provide improved means for rotating the plane of polarization of a beam of radio frequency energy; to provide improved means for rotating variably the plane of polarization of a beam of radio frequency energy; and to provide an improved radio fequency scanning system in which the plane of polarization may be rotated through any desired angle.

Figures 1, 2, 3, 4, 5:
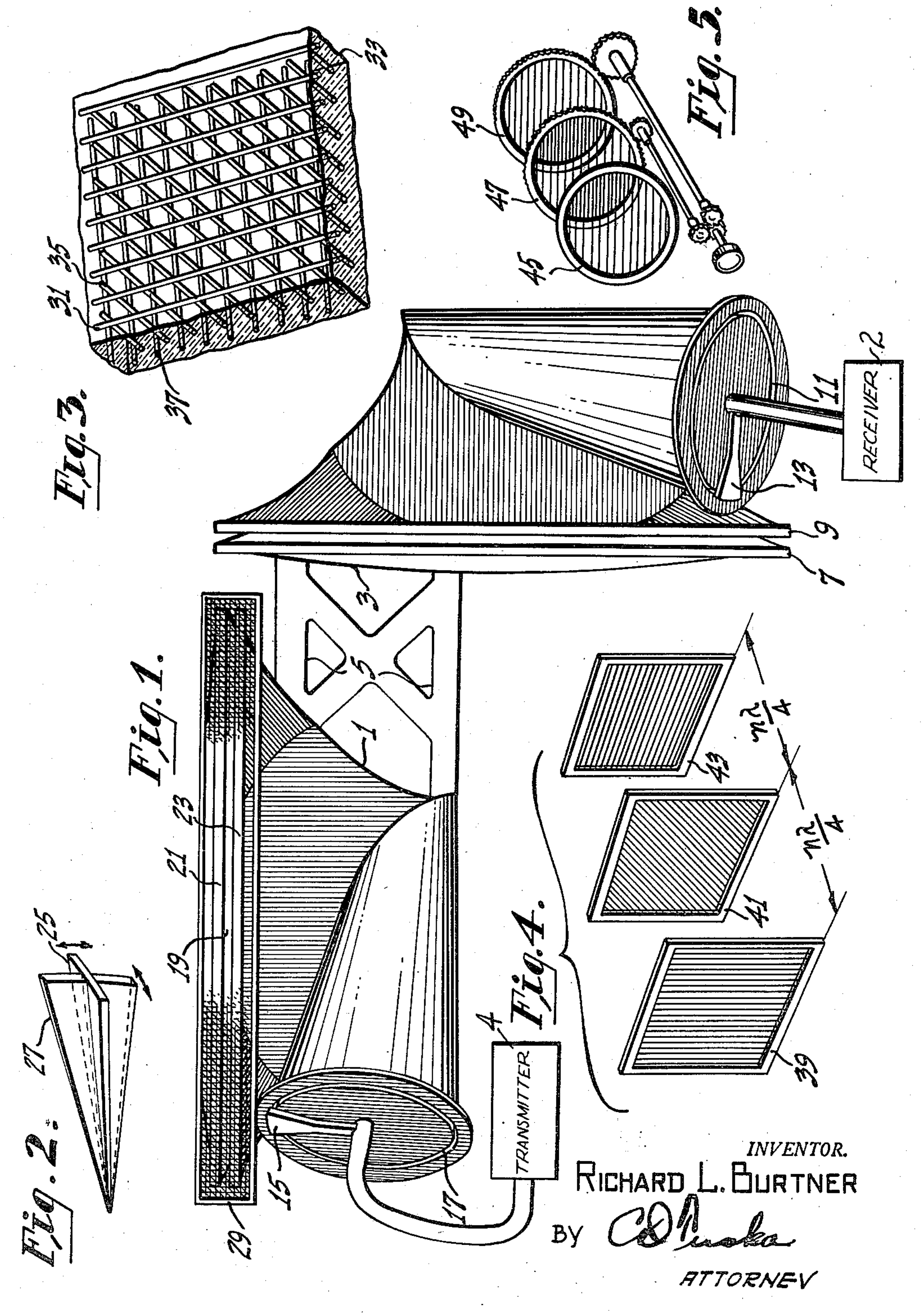
Figure 6:
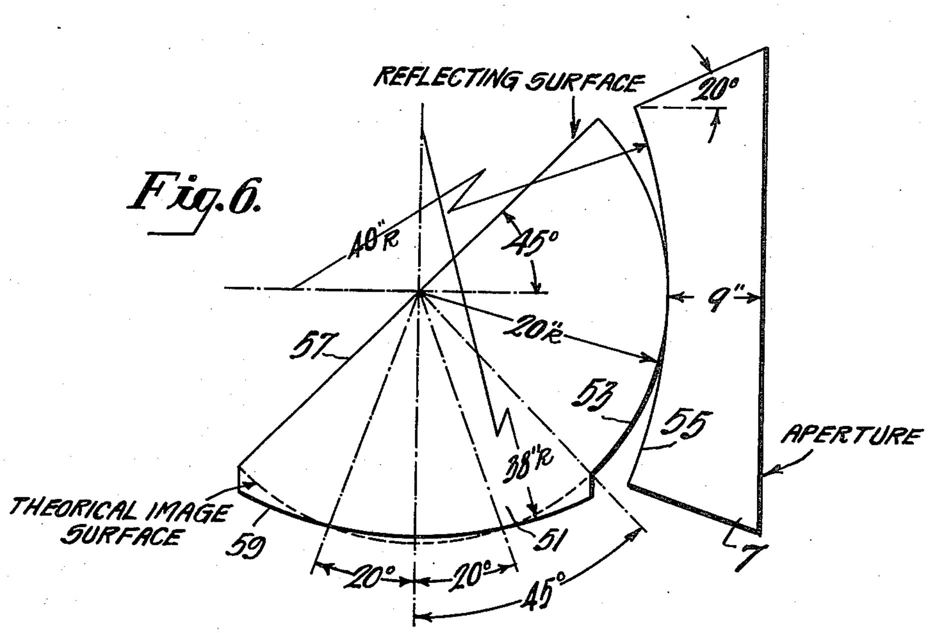
Figure 7:
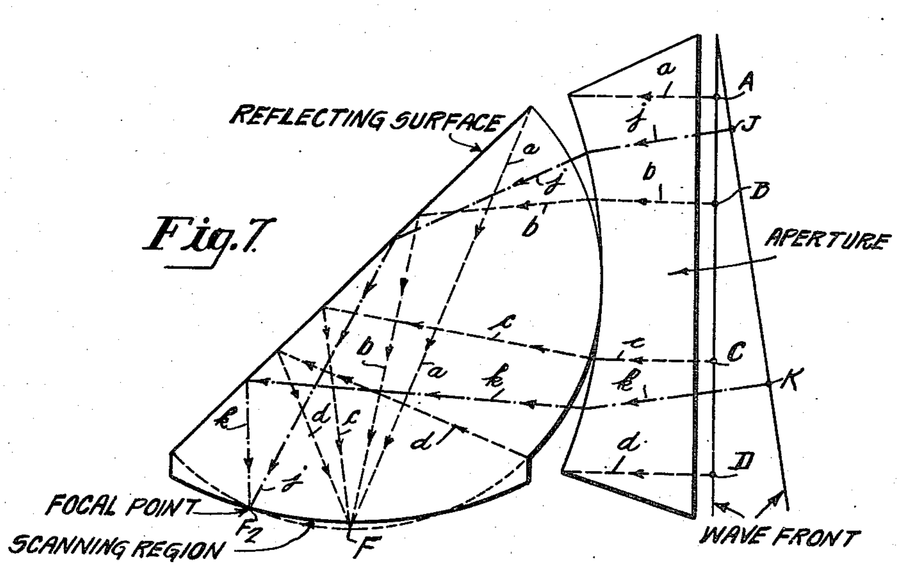

The invention will be described by referring to the accompanying drawings in which Figure 1 is a perspective view of the scanning system of the invention; Figure 2 is a schematic diagram illustrating the operation of the scanning system of the invention; Figure 3 is a perspective view of a means for rotating the plane of polarization according to one embodiment of the invention; Figure 4 is a perspective view of a modified means for rotating the plane of polarization; Figure 5 is a perspective view of another modification which provides for variable rotation of the plane of polarization from 0 degrees to 90 degrees, and Figures 6 and 7 are plan views of the wave guiding sheets before being bent to form the scanning device.

Referring to Fig. 1, a focusing means 1 is suitably connected to a focusing means 3 by brackets 5. The focusing means 1 and 3 are similar in construction and operation. Each consists of a pair of metal wave guiding means 7, 9 which are disposed in parallel spaced relation to guide the electromagnetic energy and to focus it within an annular aperture 11. The radio frequency energy or image at the focal region, in the case of a receiver, is scanned by a rotating wave guide 13 which is connected to a receiver 2. It should be understood that the receiver and transmitter in the present invention may be interchanged. For the purposes of illustration, however, the second focusing device 3 is used for receiving while the first focusing device 1 is used for transmitting.

The transmitter 4 is connected to a rotating wave guide 15. The aperture of the wave guide is disposed adjacent to and in alignment with the annular aperture 17 which defines the focal region. The radio frequency energy thus applied is transmitted through the focusing device to the aperture 19 which is bounded by the wave guiding conductors 21 and 23.

The focusing means 1 and 3 will now be described in greater detail. A pair of conductive sheets 7, 9 are cut similar to the plan of one of the sheets as shown in Fig. 7 and are spaced parallel to each other to form an aperture. These sheets are bent and are connected respectively by soldering or the like to a second pair of sheets 51 each of which is similar to the plan shown in Fig. 6. These sheets 51 are also spaced apart and are joined to the first sheets respectively along the lines 53 and 55. The geometrical arrangement of the second pair of parallel sheets includes a reflecting surface 57. The sheets 51 are rolled or bent into conical form whereby the lines 59 become the base of the cone which includes an annular opening 17 (See Fig. 1) which lies between the two wave guiding sheets. The annular opening 17 becomes the focal plane for the waves which are applied to the aperture and are guided through the first pair of parallel sheets and a portion of the second pair of parallel sheets to the reflecting surface 57, and are thereafter reflected and guided through the conical portion to the annular opening. The reflecting surface 57 is preferably formed of a good conductor which is soldered or otherwise secured between the bent parallel wave guiding sheets.

The wave paths for different points ABCD and JK in a plane parallel to the aperture and a plane wave disposed at a slight angle to the aperture respectively are traced in Fig. 7. It will be seen (1) that the first wave front ABCD is focused at the point F in the annular focal plane and (2) that the second wave front JK is focused at the point F2 in the focal plane. An inspection of the paths of the several points in the wave fronts will show that they travel substantially the same distances from the aperture to the reflecting surface and thence to the focal region, thereby the parallel guides become a unique focusing device. While the energy has been described as incoming, if the energy is applied to a point in the focal region the wave will emerge from the aperture and be propagated toward the scene to be scanned. The scanning at the annular focal regions 11 and 17 is accomplished by rotating the wave guides 13 and 15 which are connected respectively to the receiver and transmitter.

In the described device, the focusing element 1 forms a narrow beam of radio frequency energy, such as the cuneiform region represented by character 27 of Fig. 2. The rotation of the wave guide member 15 deflects this beam horizontally through an angle of approximately 40°. The reflected energy from the scene to be scanned is returned to the second focusing device which operates in a similar manner, but its response is directed along a horizontal region represented by the reference numeral 25 in Fig. 2. This pattern is deflected vertically through an angle of approximately 40° by the rotation of arm 13. At any instant a return signal is possible only from that region which lies at the intersection of the beam pattern 27 and the receiver pattern 25. As the beam and response patterns are deflected, this intersection region progressively scans the entire scene. Since the transmitter sends out a beam which is, in the present instance, vertically polarized and since the second scanning device is responsive to horizontal polarization, it becomes necessary to interpose between the transmitter and the receiver means for rotating the plane of polarization.

Such means 29 are disclosed in Figs. 3, 4 and 5. Referring first to Fig. 3, a plurality of conductors 31 are disposed in parallel spaced relation in a plane on or near the surface of an insulating material 33, such as polystyrene or any material having low losses at the frequencies of the applied waves. A second group of conductors 35 are disposed in spaced parallel relation and at an angle of preferably 45° with respect to the first conductors 31 and in a plane parallel to the first conductors 31 in the surface of the material. A third set 37 of spaced parallel conductors are disposed in a third plane parallel to the plane of the conductors 31. In the present arrangement the angle of each of the conductors of the third set of conductors is preferably 45° with respect to each of the conductors 35 of the second set. It will be observed that the conductors of the third set are also disposed at 90°, with respect to the conductors 31 of the first set of conductors. The spacing between the planes of conductors should be $$\frac{n\lambda}{4}$$

where $n$ is an odd integer and $\lambda$ equals the wave length in the material. The center to center distance between individual wires in any layer should preferably be made $$\frac{\lambda}{4}$$

or less. Wire sizes should preferably be $$\frac{\lambda}{50}$$

or less in diameter.

Since most of the available insulating materials exhibit substantial losses at the higher radio frequencies, it is preferable in some installations to use polarization filters with air spacing, as shown schematically in Fig. 4. In this arrangement the spaced parallel conductors are supported on frames 39, 41 and 43. The spacing between wire layers should be $$\frac{n\lambda}{4}$$

where $n$ is an odd integer and $\lambda$ is the wavelength in air. Figure 5 illustrates a similar polarization filter which is adjustable, whereby the plane of polarization may be rotated through any angle up to 90°. In the arrangement of Fig. 5, the first filter 45 is maintained in a fixed position whereas the second and third filters 47 and 49, respectively, are simultaneously rotated in the same direction by means of suitable gearing so that the last filter 49 rotates through twice the angle of the intermediate filter 47.

The operation of the parallel, three layer, wire screen may be understood by referring to Fig. 4. Because of the alignment of the wires only horizontally polarized components of radiation will pass through screen 39, while only vertically polarized components of radiation will pass through screen 43. Vertical components of radiation will be reflected from screen 39 while horizontal components of radiation will be reflected from screen 43. In operation, horizontally polarized radiation is directed through screen 39 and strikes screen 41. Screen 41 causes the incoming horizontally polarized radiation to be broken up into both vertically and horizontally polarized radiation. A complicated multiple reflection then takes place between the screens. Since only vertically polarized components of radiation can pass through screen 43, the transmitted wave is vertically polarized.

Thus the invention has been described as an improved radio frequency scanning system in which the radiation pattern of scanning and focusing element 1 combines with the response pattern of scanning and focusing element 3 in order to scan a scene in elevation and azimuth. Means are interposed between the scanning devices for rotating the plane of polarization through a predetermined angle whereby the reflected energy may be applied to a scanning device whose polarization differs from that of the transmitting device. Preferably, the two scanning means are operated synchronously or in a predetermined relationship, but in any event it should be understood that the indicator at the receiver is operated in synchronism with the scanning means so that the received signals may be converted into an image corresponding to the scene to be viewed.

I claim as my invention:

1. A radio frequency transmission device consisting of means for selecting a radio frequency field having a predetermined plane of polarization, a polarization filter cooperating with said means to produce from said field a component having a different plane of polarization, and a second polarization filter cooperating with said first polarization filter to produce from said component having a different plane of polarization a second component having a plane of polarization differing from said predetermined plane and said different plane of polarization whereby the polarization of the outgoing field is different from the incoming.

2. A radio frequency device comprising a dielectric material and, immersed entirely therewithin, a plurality of spaced conductors disposed parallel to each other and in one plane, a plurality of spaced conductors disposed parallel to each other and at an angle to the conductors in said one plane and in a second plane parallel to said one plane, and a plurality of spaced conductors disposed parallel to each other and at an angle to the conductors in said second plane and at an angle to the conductors in said first plane and in a plane parallel to said one plane and parallel to said second plane.

3. A radio frequency device comprising a dielectric material and, immersed entirely therewithin, a plurality of spaced conductors disposed parallel to each other and in one plane, a plurality of spaced conductors disposed parallel to each other and at an angle of 45° to the conductors in said one plane and in a second plane parallel to said one plane, and a plurality of spaced conductors disposed parallel to each other and at an angle of 45° to the conductors in said second plane and at an angle of 90° to the conductors in said first plane and in a plane parallel to said one plane and parallel to said second plane.

4. A radio frequency device including a plurality of spaced conductors disposed parallel to each other and in one plane, a plurality of spaced conductors disposed parallel to each other and at an angle of 45° to the conductors in said one plane and in a second plane parallel to said one plane, a plurality of spaced conductors disposed parallel to each other and at an angle of 45° to the conductors in said second plane and at an angle of 90° to the conductors in said first plane and in a plane parallel to said one plane and parallel to said second plane, and means for altering the relative angular positions of said conductors.

5. A radio frequency device consisting of a plurality of spaced conductors disposed parallel to each other in one plane, a plurality of spaced conductors disposed parallel to each other in a second plane spaced an odd number of quarter wavelengths from the one plane, and a plurality of spaced conductors disposed parallel to each other in a shird plane spaced an odd number of quarter wavelengths from the second plane.

6. A radio frequency device consisting of a plurality of spaced conductors disposed parallel to each other in one plane, a plurality of spaced conductors disposed parallel to each other in a second plane spaced an odd number of quarter wavelengths from the one plane, and a plurality of spaced conductors disposed parallel to each other in a third plane spaced an odd number of quarter wavelengths from the second plane, in which each of said pluralities of conductors are arranged so that the parallel conductors in each of said pluralities are disposed at angles not exceeding 45° with respect to the adjacent plurality.

7. A radio frequency transmission device comprising means for selectively transmitting a radio frequency field having a predetermined plane of polarization, means for selectively transmitting a component of said field having a different plane of polarization and for selectively reflecting a second component of said field polarized in a plane at right angles to said first component, means for selectively transmitting a further component of said first-mentioned component, said further component having a different plane of polarization from said field and said first-mentioned component, and for selectively reflecting a second further component of said first-mentioned component which is polarized at right angles to said first-mentioned further component; said reflected components being selectively transmitted and reflected by said first means and said second means to form further components polarized in the same plane as said component transmitted by said third means, whereby substantially all of the energy of said field transmitted by said first means is transmitted by said third means in a plane of polarization different from said predetermined plane.

8. A radio frequency scanning device including means for producing a cuneiform beam of radio frequency energy, means directing said beam for scanning fanwise a scene along one coordinate, additional means for similarly scanning said scene along another coordinate, said additional means being responsive to said energy.

9. A radio frequency scanning device including in combination means for creating a polarized radio frequency field having a cuneiform directive pattern substantially in a plane parallel to the electric vector of said field, means for moving said plane through a predetermined angle, means disposed at an angle with said first-mentioned means for directively responding to said field and having a maximum response to ratio frequency fields polarized at a different angle from said first-mentioned field, and means for rotating the polarization of energy arriving from said first means whereby said angularly disposed means is made responsive thereto.

RICHARD L. BURTNER.

REFERENCES CITED

The following references are of record in the file of this patent:

UNITED STATES PATENTS

| Number | Name | Date |
|---|---|---|
| 739,271 | Green | Sept. 15, 1903 |
| 2,206,923 | Southworth | July 9, 1940 |
| 2,223,950 | Brown | Dec. 3, 1940 |
| 2,364,371 | Katzin | Dec. 5, 1944 |

FOREIGN PATENTS

| Number | Country | Date |
|---|---|---|
| 668,231 | Germany | Nov. 28, 1938 |

OTHER REFERENCES

Short Wave & Television: "4-Inch Waves Turn Science Topsy-Turvy"; by Southworth, April 1938 pp. 669, 706.